(12) United States Patent
Friedman et al.

(10) Patent No.: US 7,644,799 B2
(45) Date of Patent: *Jan. 12, 2010

(54) VEHICLE SAFETY CONTROL SYSTEM

(75) Inventors: Keith Friedman, Santa Barbara, CA (US); Fred Kahl, Goleta, CA (US); Dennis Mihora, Santa Barbara, CA (US)

(73) Assignee: Friedman Research Corporation, Austin, TX (US)

( * ) Notice: Subject to any disclaimer, the term of this patent is extended or adjusted under 35 U.S.C. 154(b) by 683 days.

This patent is subject to a terminal disclaimer.

(21) Appl. No.: 11/056,539

(22) Filed: Feb. 10, 2005

(65) Prior Publication Data

US 2006/0175116 A1      Aug. 10, 2006

(51) Int. Cl.
   *B60R 21/00*   (2006.01)
(52) U.S. Cl. ........................ 180/282; 180/274
(58) Field of Classification Search ........... 180/282, 180/274
   See application file for complete search history.

(56) References Cited

U.S. PATENT DOCUMENTS

| | | | | |
|---|---|---|---|---|
| 3,871,472 | A | * | 3/1975 | Hosaka et al. ............ 280/735 |
| 4,204,196 | A | * | 5/1980 | Sveda ..................... 340/309.9 |
| 4,226,325 | A | * | 10/1980 | Vandas .................... 198/493 |
| 4,501,932 | A | * | 2/1985 | Mostyn, Jr. ............... 379/342 |
| 4,624,335 | A | * | 11/1986 | Shiraishi et al. ........... 180/422 |
| 5,492,368 | A | | 2/1996 | Pywell et al. |
| 6,182,783 | B1 | | 2/2001 | Bayley |
| 6,661,116 | B1 | * | 12/2003 | Seto ........................ 307/10.1 |
| 6,674,362 | B2 | * | 1/2004 | Yoshioka et al. ........... 340/506 |
| 6,721,553 | B2 | * | 4/2004 | Yoshioka ................ 455/404.1 |
| 7,031,814 | B2 | * | 4/2006 | Kawato et al. ............. 701/45 |
| 7,200,474 | B2 | * | 4/2007 | Motozawa et al. ......... 701/45 |
| 7,278,682 | B2 | * | 10/2007 | Friedman et al. ......... 297/216.1 |
| 7,387,184 | B2 | * | 6/2008 | Bethge et al. ............. 180/282 |
| 2002/0188393 | A1 | | 12/2002 | Yokota et al. |

FOREIGN PATENT DOCUMENTS

| | | |
|---|---|---|
| DE | 10008972 A1 | 9/2001 |
| WO | WO 01/45985 A1 | 6/2001 |
| WO | WO 2004/103779 A1 | 3/2004 |

* cited by examiner

*Primary Examiner*—Paul N. Dickson
*Assistant Examiner*—Joselynn Y. Sliteris
(74) *Attorney, Agent, or Firm*—Mark Rodgers (57) ABSTRACT

The invention is a safety control system for vehicle safety mechanisms. The novel control system uses acquired and stored data about the configuration of a vehicle passenger compartment at the time of an emergency event to determine the type, sequence and degree of safety device deployment. In one embodiment, the invention contains a novel power system employing a supplemental power supply specifically included to provide extra power beyond what is typically available from the power distribution system in conventional passenger compartment vehicle power systems. The novel power supply is routed to the appropriate safety mechanisms when the vehicle emergency event sensors, ie rollover, impact etc. detect a condition when the safety mechanism should be deployed and the extra power supply is required.

27 Claims, 8 Drawing Sheets

VEHICLE SAFETY CONTROL SYSTEM

RELATED APPLICATIONS

Not Applicable

FEDERALLY SPONSORED RESEARCH

Not Applicable

SEQUENCE LISTING

Not Applicable

BACKGROUND OF THE INVENTION

The invention relates to safety control systems for vehicle safety mechanisms, typically for use in passenger vehicles or light trucks. The invention however is also applicable to other vehicles such as cargo haulers, spacecraft, trains, construction equipment, forklifts or military vehicles.

Increasing inclusion of sophisticated safety mechanisms is the trend in vehicle design, particularly for passenger vehicles and light trucks. Many new mechanisms, such as those described in co-pending applications Ser. Nos. 10/807,325, 10/877,176, and 10/916,564, by common inventors of this invention, as well as existing safety devices, such as airbags and pretensioned safety belts, increase the protection of vehicle occupants in the event of an accident. However, protection can often be further enhanced if several of these mechanisms are used together. It would also be advantageous to deploy safety mechanisms in a fashion that took into account the configuration of the vehicle at the time an accident occurred. Configuration includes the physical layout of the vehicle as well as the location, size, weight, and possibly age and sex of the occupants. For instance a seat reclining safety mechanism for a front seat could potentially have a greater recline angle for the case where no passenger was sitting immediately behind. However, if the front seat were moved forward before reclining, a higher recline angle might be achievable without contacting a backseat passenger. This is one example of improving protection by deploying two mechanisms, recline and longitudinal positioning, in concert, with knowledge of occupant locations and size as well as vehicle structure. As multiple safety mechanisms are simultaneously deployed, it becomes increasingly important that the time phasing and magnitude of deployment be determined with knowledge of the passenger compartment configuration. To date, the extent of knowledge of the passenger compartment configuration actually used in safety deployment is to factor in occupant weight and position to modify the firing characteristics of airbags. It has also been proposed to move seats back in response to a signal from a proximity sensor indicating an imminent collision. These devices fall well short in addressing the issue of optimized deployment of multiple safety mechanisms for particular passenger compartment configurations. It is one object of this invention to provide a novel solution to this issue.

Furthermore, many safety mechanisms rely on systems, that when deployed, may require more electrical power than is typically available in the passenger compartment of the vehicle. A safety mechanism requiring that a motor, which reclines a seat, operate much faster during a rollover accident than during normal operator seat positioning, is an example of a situation where increased electrical power must be available. Although the main battery/alternator power system common in vehicles is capable of delivering a large amount of power in the engine compartment (ie starter motor operation), typically the power distribution system in the passenger compartment and other parts of the vehicle is routed through a current limiting device, such as a fuse box. Thus the wiring system past the fuse box is typically limited to 30 amperes of current or less. However, the emergency deployment of safety systems may, at least for short durations, require significantly more power than can be accommodated by conventional power distribution systems. Thus it is a further object of the invention to provide a solution for the emergency power requirements of vehicle safety mechanisms.

BRIEF SUMMARY OF THE INVENTION

In one embodiment, the invention is a vehicle safety control system for a vehicle which includes passenger seats. The control system includes at least one interface to a device which provides a signal indicating an emergency condition, at least one electrical interface to an actuator which moves all or part of at least one seat and, a control unit connected to the interfaces. The control unit, in response to receiving an emergency condition signal, activates at least one seat actuator initiating at least a one motion of at least one seat, such that the seat motion distance and duration depend on the configuration of the vehicle and seat occupants at the time of the emergency signal.

In one version, the configuration includes at least one of starting recline angle of at least one seat, starting longitudinal position of at least one seat, starting height of at least one seat, seat belt status, occupant presence for at least one seat, occupant height, occupant weight, or passenger compartment geometry. In one aspect, the emergency condition signal is at least one of an output from a rollover sensor, an output from an impact sensor, an output from a proximity sensor, or data from an Electronic Stability Control System.

In a further version, at least one actuator is a motor. In another aspect, the control system includes a programmable processor. In a further version, the control system includes memory for the processor in which vehicle configuration information is stored. In one aspect, the vehicle configuration information includes the location of structural elements which limit the range of motion of the seats. In one version, the interface to determine the configuration is to at least one of an angular encoder, a linear encoder, a position switch, an optical position sensor, a weight sensor, or an electronic stability control (ESC) system.

In another embodiment, at least one of a rollover sensor or an impact sensor is packaged as part of the control system. In yet another embodiment, the control system includes an interface to safety device status data. In one version, the safety device status data includes power supply charge and fault indicators.

In one version, at least one interface is a wired connection. In another, at least one interface is a wireless connection. In another embodiment, the control system includes a user interface including displays and indicators.

For many of the embodiments, versions and aspects, the vehicle may have at least one seat with an integrated safety belt and a safety belt pretensioner. The pretensioner may also be actuated in response to a emergency condition signal.

In another embodiment, the invention is a vehicle safety control system for a vehicle, including at least one interface to a device which provides a signal indicating an emergency condition, at least one electrical interface to an actuator, requiring more power to operate in an emergency event then available for normal operation in the vehicle, a power source, supplemental to the main vehicle power system, specifically for powering the actuator during emergency deployment, and a control system which, in response to emergency identification, connects the actuator to the supplemental power source.

In one version, at least one actuator is a motor, and in an aspect the motor moves all or part of at least one vehicle passenger seat. In a further aspect, the seat motion distance and duration depend on the configuration of the vehicle and seat occupants at the time of the emergency signal.

In another embodiment, the supplemental power source is a capacitor or a bank of one or more capacitors. In another embodiment the supplemental power source is one or more batteries. In one version, the battery(ies) or capacitor(s) is charged by another vehicle power source during normal operation of the vehicle.

In one version, the motor comprises two windings, one for normal use and one for use during emergency deployment. In one aspect, the supplemental power system is connected to the emergency winding by the control system in response to a signal from the sensor. In another embodiment the invention includes a reducing device for reducing the main vehicle voltage to a motor which normally operates at a voltage less than the vehicle supply voltage. In this case, the supplemental power source supplies a higher voltage, possibly the same as the vehicle supply voltage, during the emergency. In one version, the reducing device is a divider network. In another it is DC-DC converter circuit.

In another embodiment, the controller includes a switching device to switch the actuator from normal operation power to the supplemental emergency power source. In one version the switching device is a solid state switching circuit.

In one aspect the deployment of the actuator is controlled by parameters including activation time, cutoff position or cutoff angle. In another version, the supplemental power source includes diagnostic and failsafe indicators and monitors, for parameters including voltage, charge, or over-current.

In a preferred embodiment, the invention is a vehicle safety control system for a vehicle. The control system includes at least one interface to a device which provides a signal indicating an emergency condition. These devices include rollover sensors, impact sensors, proximity sensors and ESC. The control system may have at least one electrical interface to an actuator, requiring more power to operate in an emergency event then available for normal operation in the vehicle. These actuators, requiring higher power include motors, slow burn pyro-technic actuators, explosive bolts, and solenoids. The actuators may actuate seat motion, window and seat bolsters, window screens, parachute drag systems, motion arresters, pretensioners, and other devices. The control system may further include a power source, supplemental to the main vehicle power system, specifically for powering the actuator during emergency deployment. The control system includes a programmable controller connected to the actuator interfaces and connected to additional interfaces for determining vehicle passenger compartment configuration such as seat position, occupant size and weight and safety device status. The programmable controller may also access stored data about the passenger compartment structure. Depending on the nature of the emergency signal, the starting position of the seats, the presence and size of seat occupants, and the constraints of the passenger compartment structure, the controller causes actuators under it's control to reconfigure the passenger compartment, as well as external devices, to improve the safety of the occupants.

BRIEF DESCRIPTION OF THE DRAWINGS

The invention will be better understood by referring to the following figures.

DETAILED DESCRIPTION OF THE INVENTION

Figure 1:
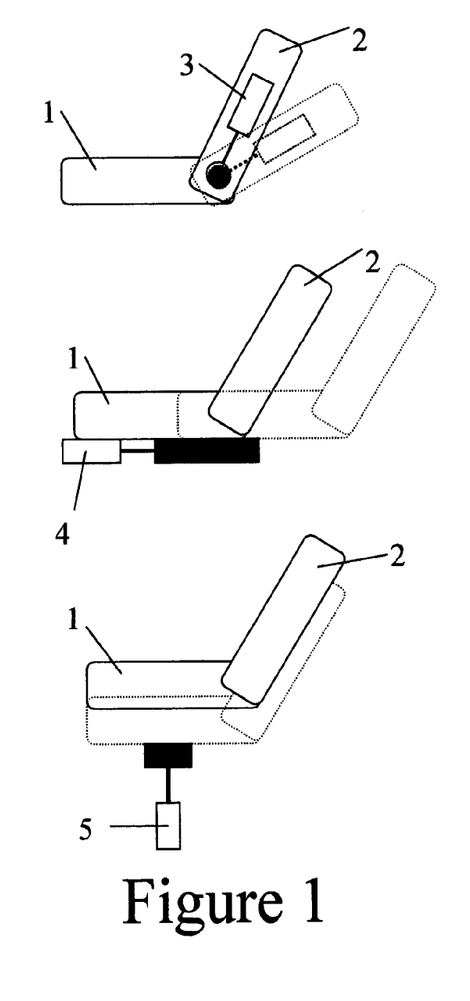
FIG. 1 shows some examples of safety actuators which benefit from the invention.

Referring to FIG. 1, exemplary safety mechanisms that can benefit from the invention are shown. Seat bottom 1 and back 2 can be moved rapidly in the event of an accident to increase occupant protection. Actuator 3 reclines seat back 2 and possibly bottom 1 to move the occupant farther from the roof in the event of a rollover accident. Actuator 4 positions the seat laterally for improved safety in the event of an accident. Actuator 5 moves the seat down. A particularly useful implementation for these actuators is to use motors. As described in co-pending application Ser. No. 10/807,325, incorporated herein in it's entirety by reference, many seat designs already have motors that perform these functions for routine seat adjustment. The seat adjustment operation requires the motors to run relatively slowly. However the required motion during an emergency condition may require much higher speed, higher power operation. Therefore, particularly for motor driven safety mechanisms, deployment during an accident may exceed the power normally available from the vehicle.

Other active safety mechanisms may deploy in the event of an accident or emergency situation. Examples include airbags, seat belt pretensioners, deployable rollbars, and side bolsters, to name a few. Many vehicles are already equipped with more than one safety device, and it is envisioned that increased availability of safety devices will be the trend. Depending on the type of emergency situation, different combinations of deployment may be advantageous. Furthermore, the physical structure of the vehicle passenger compartment and the presence and characteristics of occupants may also affect the deployment of safety devices. The example above of the case where a passenger is sitting behind the seat to be reclined is a case in point. Another example is the case of a pickup truck where reclining the seat may contact the back wall of the passenger compartment. If the seat were moved forward and down, more recline angle could be achieved. However the size of the occupant would be a factor in how far forward the seat could be moved.

Figure 2:
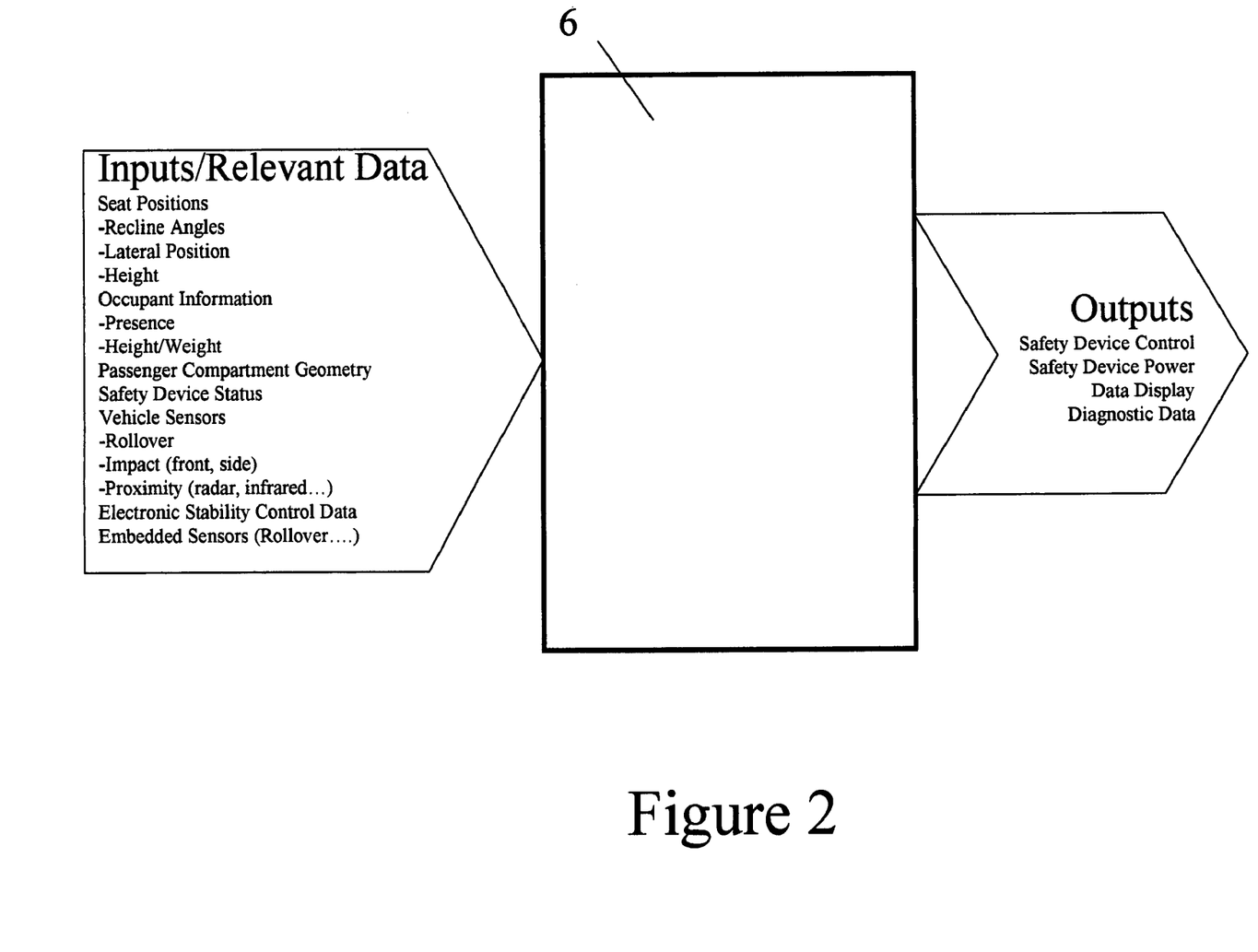
FIG. 2 illustrates the type of inputs and outputs that may be utilized by the invention.

FIG. 2 illustrates the general form of an embodiment of a novel safety control system. Control system 6, as opposed to conventional systems, has a wide variety of inputs which contain information about the instantaneous configuration of seats and passengers, information about the interior structure of the vehicle, ie position of bulkheads, dividers and supports, status of the safety deices themselves, and information from sensors and vehicle performance modules that indicate occurring or imminent emergencies. Control System 6 uses the inputs to determine what safety systems can be advantageously deployed, and the order and degree of deployment.

Inputs to control system 6 may include information about the seats, including recline angle, lateral position, and seat height. The control system may also use information about the occupants, such as which seats are occupied, and the size and weight of occupants. The control system may also have stored information about the geometry of the passenger compartment such as position of bulkheads, supports or other constraining structures.

A variety of sensors and other devices may provide the control system with information about impending or occurring emergencies. Rollover sensors and impact sensors provide input to the control system about occurring conditions. Proximity sensors such as radar or infrared may provide warning of impending emergencies. Impending emergencies may also be detected by devices such as Electronic Stability Control systems (ESC), which may also provide input to the safety control system.

The novel control system uses all or a subset of these and other inputs, and then controls safety devices based on the inputs. The control system may also provide other outputs such as safety device power, data display, and diagnostics. Although a system that only uses a subset of the inputs and provides only a subset of the outputs is within the scope of the invention, a richer implementation is preferred.

Figure 3:
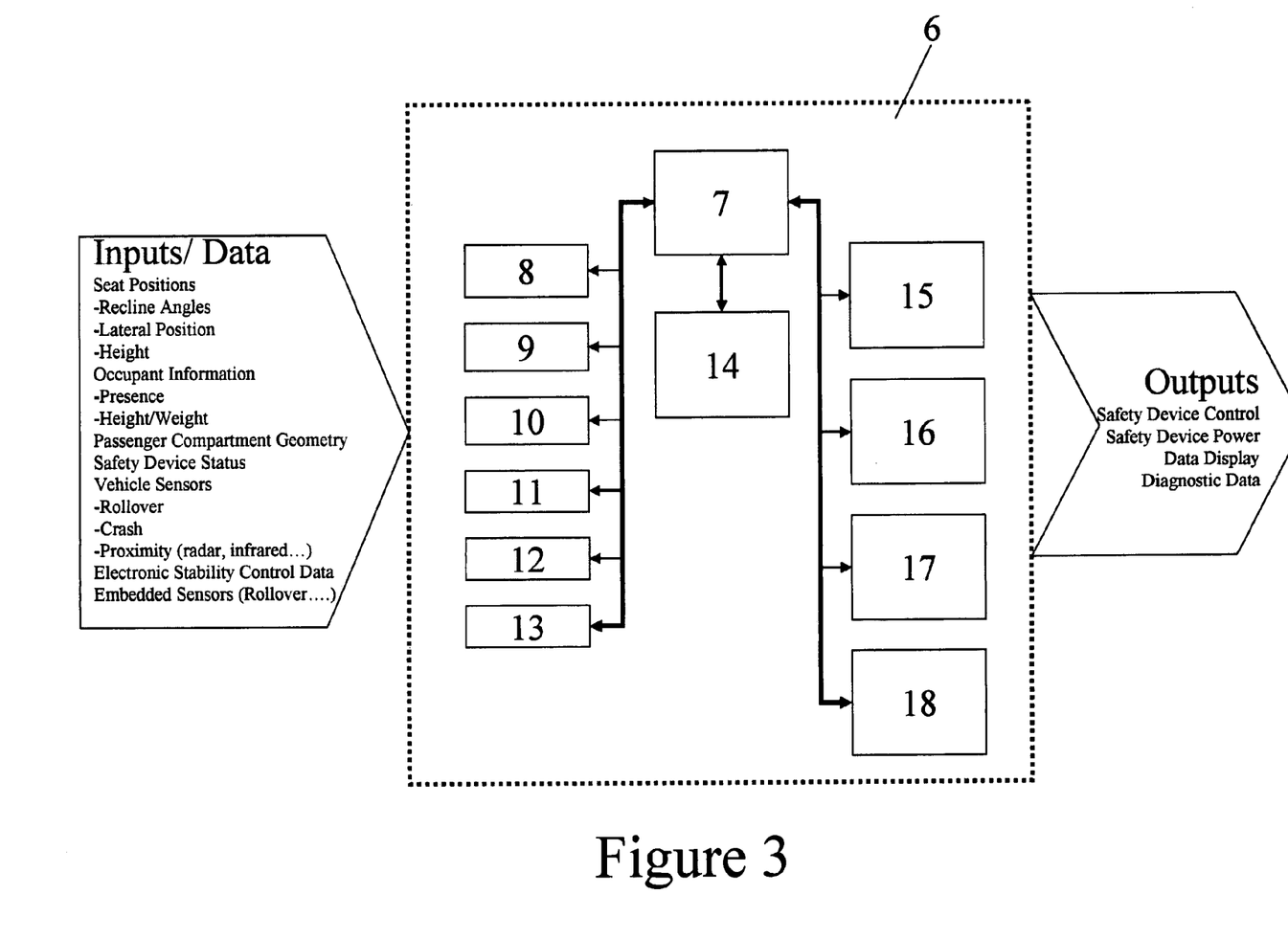
FIG. 3 shows one embodiment of the invention in block diagram form.
Figure 4:
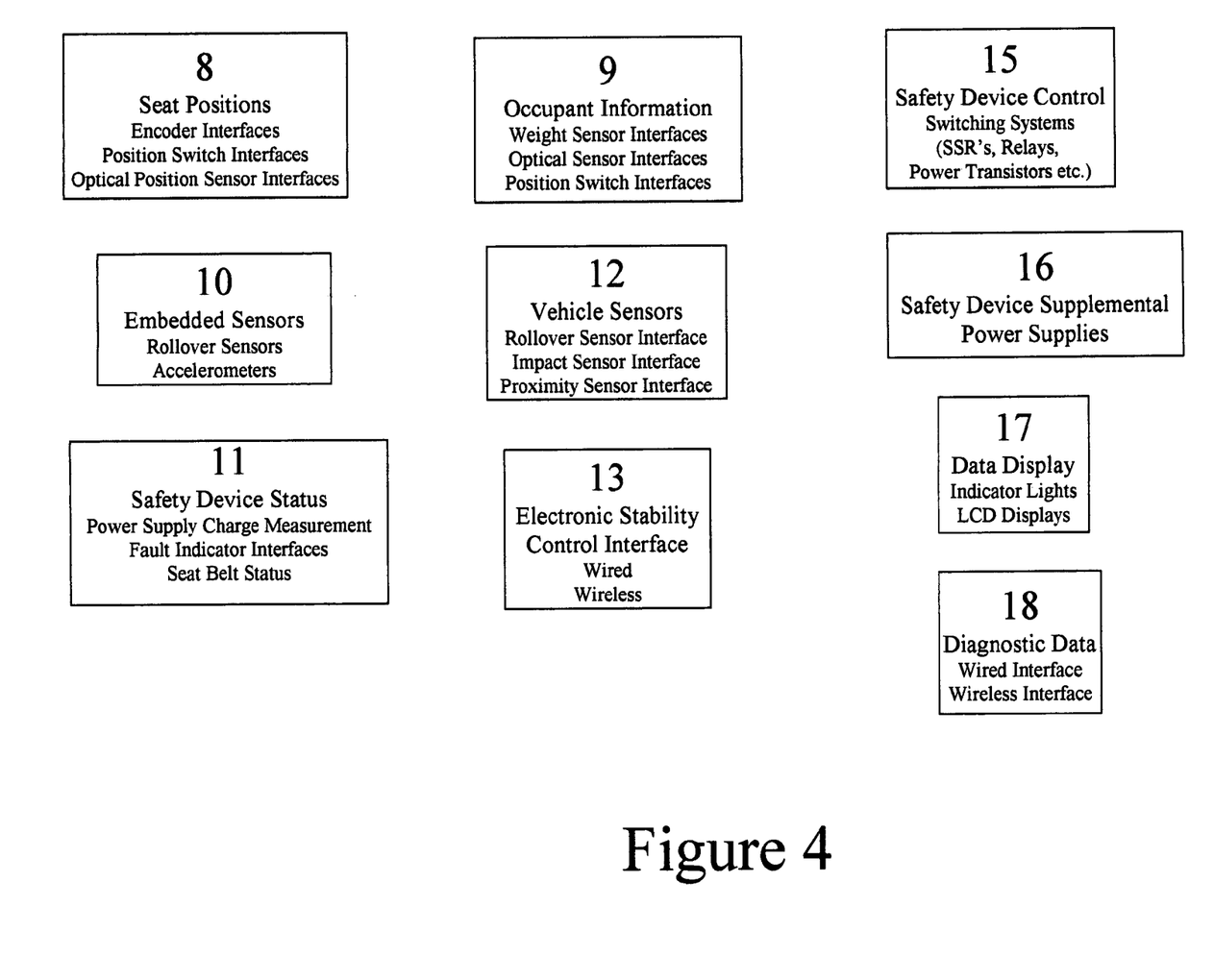
FIG. 4 is a detailed illustration of the components of the invention.

Referring to FIG. 3, a preferred embodiment of the invention is shown. The control system is implemented with programmable processor 7 and memory 14. The processor 7 accepts inputs from interfaces 8-13, and provides outputs to interfaces 15-18. Data about the passenger compartment structure is stored in memory 14. Exemplary interfaces are shown in FIG. 4. Seat position interfaces 8 may include encoder interfaces, both rotary and linear which provide seat position and or recline angle information. Position interfaces 8 may also include mechanical or optical position switch interfaces. Occupant information interfaces 9 may include weight sensors and position sensors, optical or mechanical.

Emergency sensor interfaces 12 include impact and rollover, as well as proximity sensors such as radar or infrared. These sensors 10 may also be embedded in the controller if not available in the vehicle. The processor 7 may also interface to the vehicle ESC 13. Interfaces may be either wired or wireless. The processor 7 may also interface 11 to status monitors such as power supply charge monitors or fault indicators.

The processor also provides control to the safety devices through interfaces 15, which may include switching devices such as relays or SSR's, or drivers such as power transistors. Safety device power supplies 16 may also be part of the system as will be described in greater detail below. Data displays such indicator lights or LCD's 17 and diagnostic data interface 18 are also contemplated. Safety belt pretensioners may also be actuated by the control system The novel control system is particularly suitable as a retrofittable unit to enhance the safety of existing vehicle designs. All of the functionality described above may be packaged into integrated units which may be easily added to existing vehicles, particularly vehicles with powered seats, as will be described below in more detail. A possible implementation is one unit per seat for example. Obviously other implementations are possible and within the cope of the invention. The control system may also include embedded rollover or impact sensors if desired or not otherwise available in the vehicle.

A control system as described offers highly tailored responses to specific emergency scenarios. An example of what is possible with such a system will serve to illustrate the benefit.

Example:

A vehicle with a passenger in both an adjacent front and back seat begins to roll. The control system has access to encoders which provide the initial seat angle of both seats and the front seat position. The system also has access to sensors which indicate the presence of occupants in the seats as well as optical sensors which indicate the size and placement of the occupants. The system has stored information about the placement of the dashboard. As the vehicle rolls, a rollover sensor signal is received by the control system. The control system switches emergency power to the front seat longitudinal position motor to move the seat rapidly rearward or forward as appropriate while maintaining clearance between the front seat passenger and the dashboard. The control system actuates rapid reclining of the front seat back without contacting the rear seat passenger. Safety belt pretensioners are actuated. The result is the head of the front seat passenger is optimally positioned rearward and downward away from the intruding roof structure, while maintaining clearance for the rear seat occupant if present.

Figure 5:
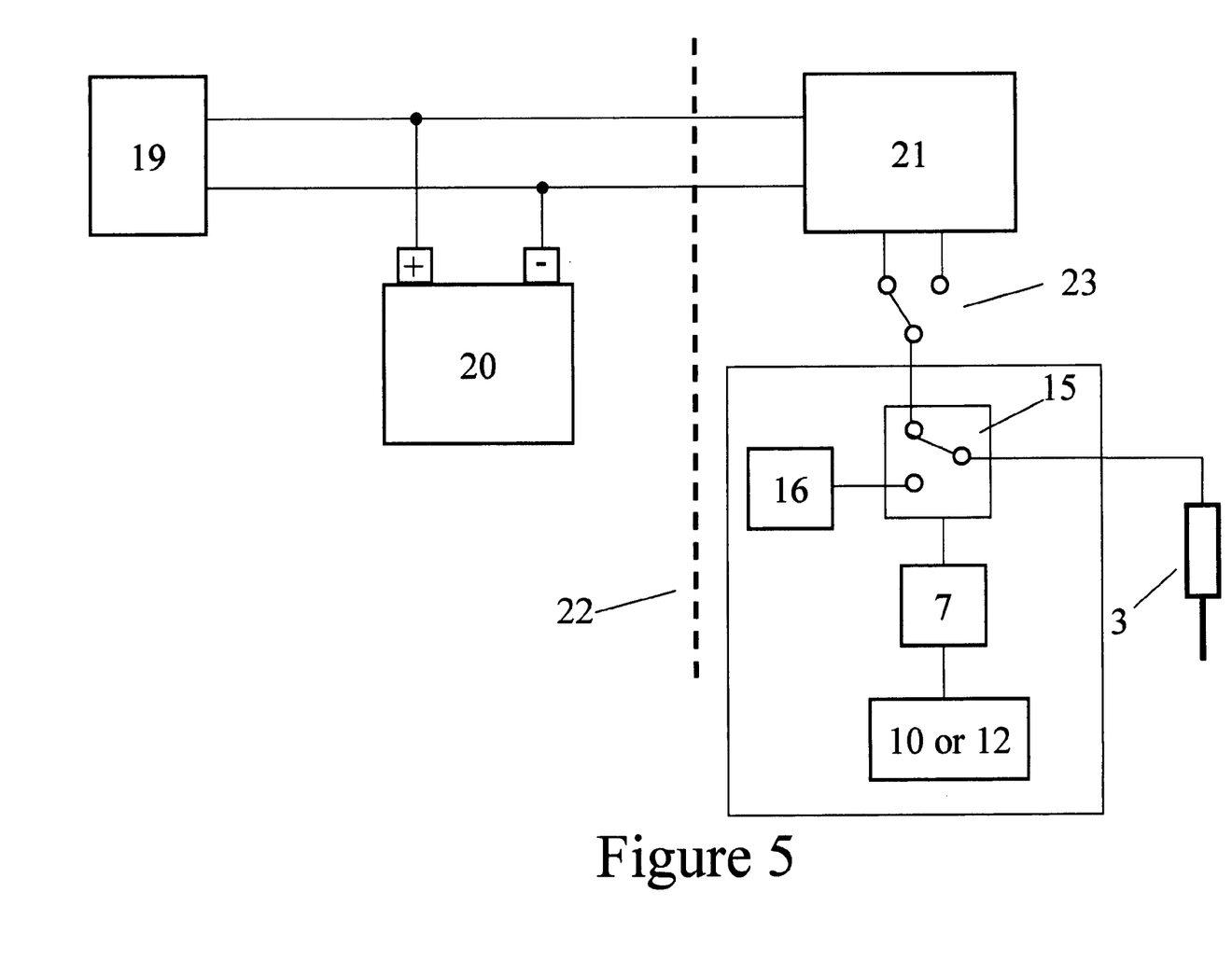
FIG. 5 shows another embodiment of the invention.

As mentioned earlier, for motor driven safety mechanisms, deployment during an accident may require power exceeding that normally available from the vehicle. Other safety actuators, such as slow burn pyrotechnic actuators, solenoids, and explosive bolts may also require very high power for the duration of actuation, beyond what can be supplied from conventional vehicle power systems. For this scenario, the novel control system may further include supplemental power for emergency operation. FIG. 5 illustrates the operation of this aspect of the invention. The vehicle has an electrical power source 20, typically a battery and alternator/generator driven by the vehicle engine. Although 12 VDC is a common vehicle operating voltage, other voltages are commonly employed, and other power supplies such as fuel cells are also possible power sources. The specific characteristics of power source 20 are not critical to the invention.

Power from the source 20 is typically routed to components 19 (usually engine compartment components) which may require very high power, such as starter motors. The wiring and cabling in this part of the vehicle is large and capable of handling high currents, as much as 100 amps or more, and tolerating high temperatures. Thus the electrical system in many vehicles has a high power portion shown on one side of divider 22 in the figure. The electrical system in the passenger, cargo section, or other parts of the vehicle is typically much lower power. Cabling from the main power source 20 is usually connected to a current limiting device 21, such as a fuse box, from which most components in the vehicle derive power. We will refer to device 21 hereafter as "the fuse box", but use of other current limiting devices is within the scope of the invention. The cabling from the fuse box 21 to electrical components such as lights, adjustment motors, audio systems etc. is designed to accommodate low to moderate current levels, typically 30 amps or less. Emergency devices may have short term requirements for much higher power levels, even possibly exceeding what may be available in the engine compartment.

In the figure, a seat recliner motor 3 is shown as one example of the application of the invention. Power from fuse box 21 is typically routed directly to motor 3 usually through an operator and/or vehicle control unit 23, which typically is a forward and a reverse motion control device. The invention operates as follows. A routing device 15 is connected to an supplemental power source 16, capable of supplying at least for a short duration higher current and/or voltage than available from fuse box 21. The nature of the routing device will change depending on the specific application as will be described below. In many cases, 15 will be a relay, a solid state switch switching circuit, or other controllable switching device that transfers actuator 3 from main vehicle power 21 to supplemental power source 16 for safety deployment. An external sensor, 10 (or 12 if the sensor is embedded in the control system), such as a rollover sensor, or impact sensor, is connected to control electronics 7. A wide range of electronics complexity is contemplated. A programmable processor is preferred, but simple interface electronics between sensor 10 and router 15, are also within the scope of the invention. When an emergency event is detected by sensor 10, power from the supplemental power source 16 is routed to the actuator 3, causing actuator 3 to operate at higher speed then during normal operation. For the case of a recliner motor 3, during connection to supplemental power source 16, actuator 3 will recline a vehicle seat rapidly backward.

Figure 6:
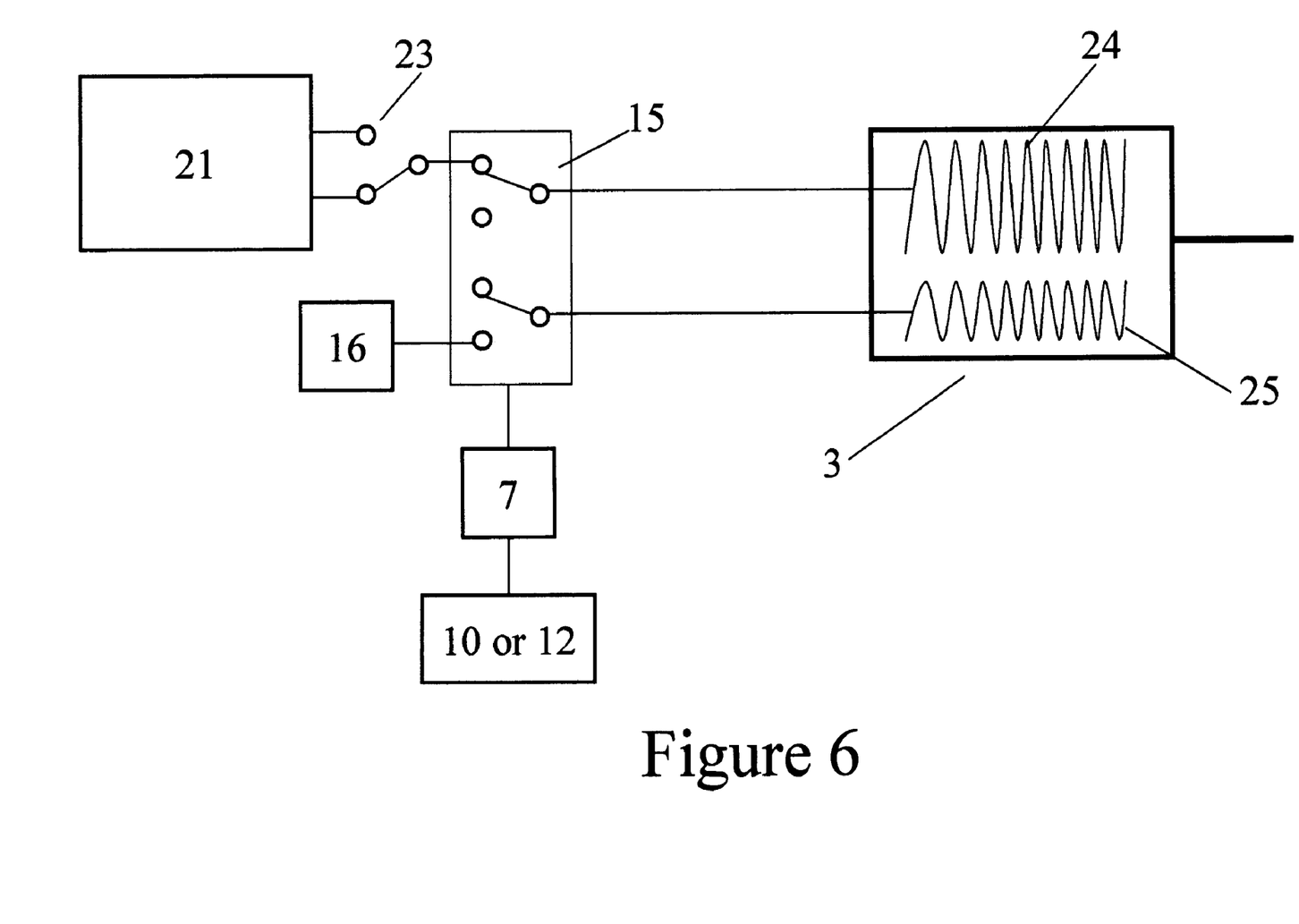
FIG. 6 shows one version of the embodiment.

A specific implementation is shown in FIG. 6. In this embodiment, actuator 3 is a dual winding motor. Winding 24 is employed during normal operation. In the event of a situation requiring high power operation, routing unit 15 connects supplemental source 16 to high power winding 25. Preferentially, but not required, power would be removed from winding 24 by 15 as well. Supplemental power source 16 supplies a short duration of high voltage/current to winding 25 causing high speed operation of motor 3 for the short duration. For example, sensor 10 may be a rollover sensor. In the event of a rollover, power is switched to the high current winding 25 causing rapid reclining of the seat.

Figure 7:
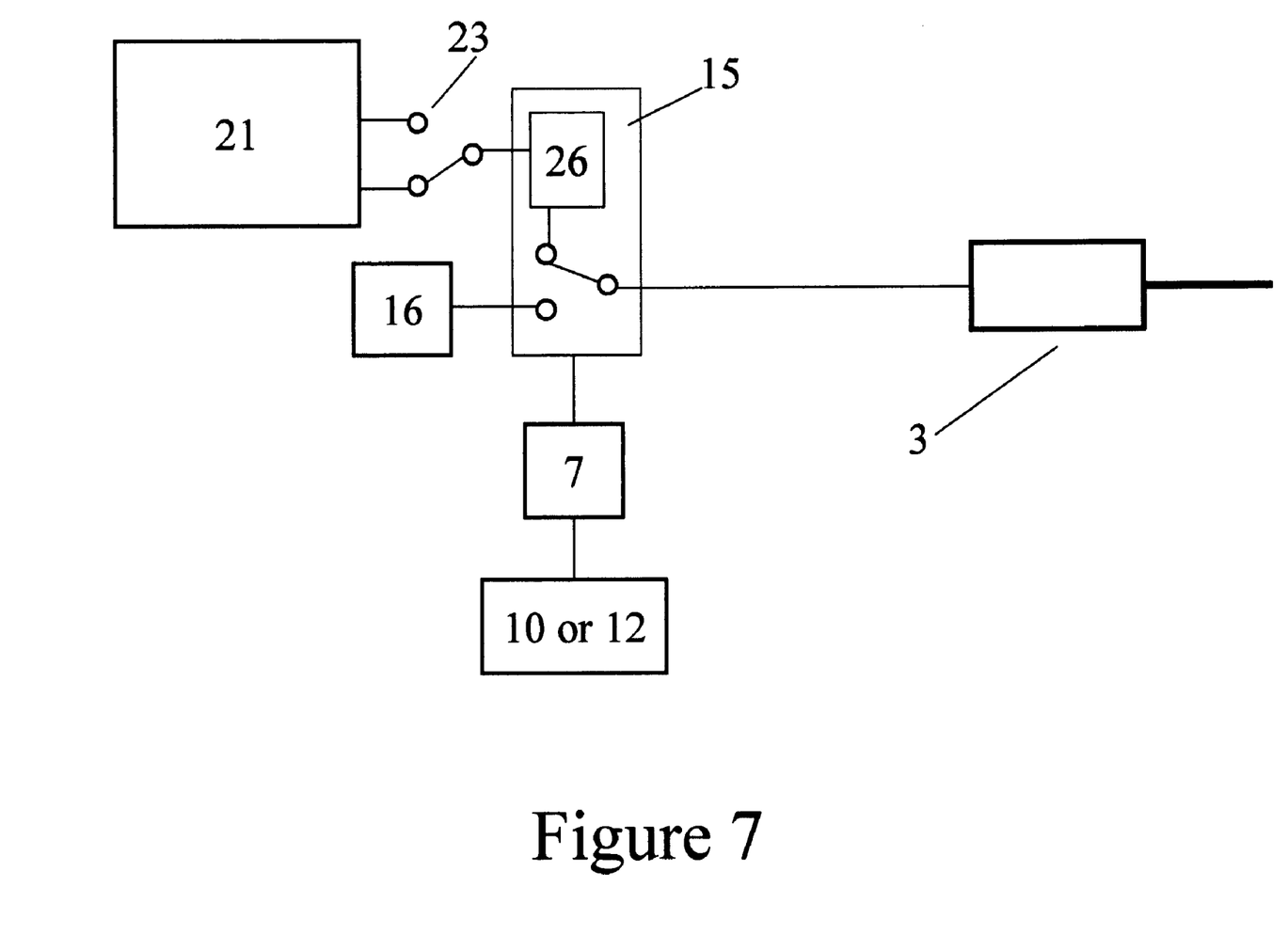
FIG. 7 shows another version of the embodiment.

Another embodiment is shown in FIG. 7. Actuator 3 may be a motor chosen to operate normally at a low voltage, possibly lower than the vehicle operating voltage. Thus a voltage reduction network, 26, is placed between the actuator 3 and the actuator control 23. A specific example is the inventors employed a divider network that reduced a 12 VDC vehicle supply voltage to a lower voltage for normal operation. A motor was chosen that ran at a useful speed for normal seat adjustment at 1 VDC. During an emergency event, the supplemental power supply 16 is switched in. For the particular example, supplemental power supply 16 is a 12 VDC battery connected to the actuator 3 directly by the switching system 15 during an emergency event.

It is envisioned that supplemental power supplies will typically only operate for short durations during deployment, so even though they are capable of providing high power for a short term, their actual storage capacity typically need not be large. As such they can be small, and mounted in close proximity to the actuators. This approach allows the majority of the vehicle power system to remain in the low current regime. Possible power sources are capacitors or capacitor banks or rapid discharge batteries, such as lead acid type. The inventors have shown that even a small battery, if discharged rapidly without current limiting, can cause a suitable motor to fully recline a seat rapidly once per discharge. In fact, to ensure full reclining, it is preferable to use a power source with more than enough power to fully recline the seat, and use a timer in controller 7 or mechanical stop to ensure that the seat reclines to a proper position (more sophisticated recline regimes are described below). These power sources could be connected to a trickle charging device powered by the vehicle main power system, thus insuring that the supplemental power supply is always ready for emergency use. As previously mentioned, the entire unit; sensor (if not available elsewhere in vehicle), control system, power router and cabling can be one or more integrated packages conveniently mountable or retrofittable in existing vehicle designs, under a seat for example.

Figure 8:
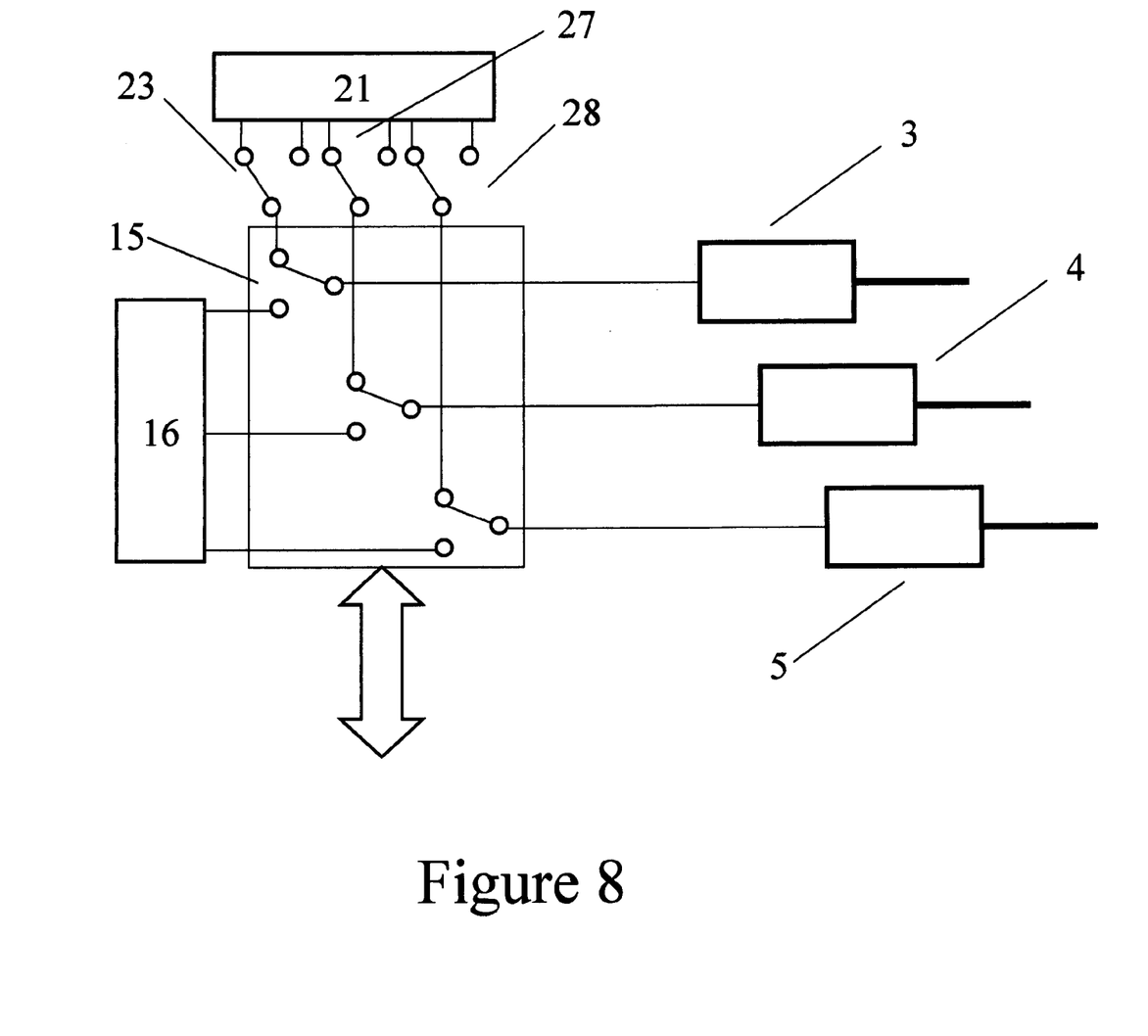
FIG. 8 shows a more complex version of the embodiment.

An uncomplicated system, which switches an actuator to an alternate power source in response to a sensor signal, is the simplest embodiment of the invention. Such a system could terminate operation by simply having just enough capacity for one seat recline per charge. However the use of a programmable processor at 7 enables a wide range of increased functionality, further improving occupant safety. As shown in FIG. 8, the routing system could direct the alternate power source (or sources) to multiple actuators 3, 4 and 5, which could for example be the recliner, front/back positioner, and up/down positioner for a seat.

Clearly a programmable processor can take different actions depending on the information available. For instance, if the supplemental power supply is faulty or not charged an alarm or operation lockout could result. As discussed above, depending on the current seat position, seat belt status, the vehicle configuration, and whether or not the seat behind is occupied, the seat may repositioned as well as reclined, and the recline angle could vary depending on these variables. The recline angle, or other motion, could be controlled in a variety of ways, including, activation time, or cutoff position or angle measured by position switch or encoder. In the event of a imminent collision or loss of control detected by collision detectors or ESC data, predeployment of the actuators may be desirable. Of course for predeployment, if an accident does not actually occur, it would be advantageous for the controller to reposition the actuators to an operable position.

The inventors envision versions of the novel safety system with extensive diagnostic and failsafe indicators and monitors. Probes can be used and monitored for parameters such as voltage, charge or over-current conditions and recorded to determine if the system deployed properly, akin to black box recorders in aircraft. This information and other diagnostic information could be available over a wireless connection or by plug-in terminal, such as diagnostic hand-held terminals commonly used for automotive diagnostics. Also the supplemental supply could have indicator displays that give status information for relevant parameters such as those mentioned above. The invention could also be employed as a power source for other safety devices beyond those used as examples, such as safety bolsters, deployable roll bars, drag parachutes,. vehicle arresters, compartment separation schemes, or anti roll stabilizers. Manual control for partial or pre-deployment of safety devices could also be accommodated if desired by allowing for manual positioning of devices such as bolsters during non-emergency operation.

We claim:

1. A vehicle safety control system for a vehicle, comprising;

at least one interface to a device which provides a signal indicating an emergency condition, at least one electrical interface to an actuator, wherein the actuator is connected to a main vehicle power source during normal operation, and the actuator requires more power to operate in an emergency event than available for normal operation in the vehicle, a power source, supplemental to the main vehicle power system, specifically for powering the actuator during emergency deployment; and, a control system which, in response to emergency identification, connects the actuator to the supplemental power source.

2. The system of claim 1 wherein at least one actuator is a motor.

3. The system of claim 2 wherein the motor moves all or part of at least one vehicle passenger seat.

4. The system of claim 3 wherein the seat motion distance and duration depend on the configuration of the vehicle and seat occupants at the time of the emergency signal.

5. The control system of claim 4 wherein the configuration includes at least one of;
- starting recline angle of at least one seat,
- starting longitudinal position and/or lateral position of at least one seat,
- starting height of at least one seat,
- seat belt status,
- occupant presence for at least one seat,
- occupant height,
- occupant weight; and,
- passenger compartment geometry.

6. The control system of claim 4 wherein the emergency condition signal is at least one of;
- an output from a rollover sensor,
- an output from an impact sensor,
- an output from a proximity sensor; or,
- data from an Electronic Stability Control System.

7. A control system as in claim 4 further comprising a programmable controller.

8. The system of claim 7 further comprising memory for the programmable controller in which vehicle configuration information is stored.

9. The system of claim 8 wherein the vehicle configuration information includes the location of structural elements which limit the range of motion of the seats.

10. The system of claim 4 wherein the interface for the configuration data is to at least one of;
- a angular encoder,
- a linear encoder,
- a position switch,
- an optical position sensor,
- a weight sensor; or
- an electronic stability control system.

11. The system of claim 4 wherein at least one of a rollover sensor or an impact sensor is packaged as part of the control system.

12. The system of claim 4 further comprising an interface to safety device status data.

13. The system of claim 12 wherein the safety device data includes power supply charge and fault indicators.

14. The system of claim 4 wherein at least one interface is a wired connection.

15. The system of claim 4 wherein at least one interface is a wireless connection.

16. The system of claim 2 wherein the motor comprises two windings, one for normal use and one for use during emergency deployment.

17. The system of claim 16 wherein the supplemental power system is connected to the safety winding by the control system in response to an emergency identification.

18. The system of claim 2 further comprising a device for reducing the main vehicle voltage to the motor during normal operation.

19. The system of claim 18 wherein the reducing device is at least one of a divider network or a DC-DC converter.

20. The system of claim 1 wherein the supplemental power source provides at least one of higher voltage or higher current capability than available from the main vehicle power system.

21. The system of claim 1 wherein the supplemental power source is at least one capacitor or capacitor bank.

22. The system of claim 1 wherein the supplemental power source is at least one battery.

23. The system of claim 1 wherein the control system includes a switching device to switch the actuator from normal operation power to the supplemental emergency power source.

24. The system of claim 23 wherein the switching device is a solid state switching circuit.

25. The control system of claim 1 wherein the deployment of the actuator is controlled by parameters including activation time, cutoff position or cutoff angle.

26. The system of claim 1 wherein the supplemental power source includes diagnostic and failsafe indicators and monitors, for parameters including;
- voltage,
- charge; or,
- over-current.

27. A vehicle safety control system for a vehicle, comprising;
- at least one interface to a device which provides a signal indicating an emergency condition, wherein devices include rollover sensors, impact sensors, proximity sensors and Electronic Stability Control,
- at least one electrical interface to an actuator, wherein the actuator is connected to a main vehicle power source during normal operation, and the actuator requires more power to operate in an emergency event than available for normal operation in the vehicle, wherein actuators include motors, slow burn pyrotechnic actuators, solenoids, and explosive bolts,
- a power source, supplemental to a main vehicle power system, specifically for powering the actuator(s) during emergency deployment; and,
- a programmable controller connected to the actuator interfaces and connected to additional interfaces to vehicle passenger compartment configuration including seat position, occupant size and weight and safety device status, and having stored data about passenger compartment structure; wherein, depending on the nature of the emergency signal, the starting position of the seats, the presence and size of seat occupants, and the constraints of the passenger compartment structure, causes actuators to reconfigure the passenger compartment and other parts of the vehicle to improve the safety of the occupants.

* * * * *